(12) United States Patent
     Tsai

(10) Patent No.: US 10,788,686 B2
(45) Date of Patent: Sep. 29, 2020

(54) EYE-PROTECTIVE SHADE FOR AUGMENTED REALITY SMART GLASSES

(71) Applicant: Ching-Lai Tsai, New Taipei (TW)

(72) Inventor: Ching-Lai Tsai, New Taipei (TW)

(73) Assignee: Ching-Lai Tsai, Taipei (TW)

( * ) Notice: Subject to any disclaimer, the term of this patent is extended or adjusted under 35 U.S.C. 154(b) by 33 days.

(21) Appl. No.: 16/166,182

(22) Filed: Oct. 22, 2018

(65) Prior Publication Data

US 2019/0056604 A1    Feb. 21, 2019

Related U.S. Application Data

(63) Continuation of application No. 15/261,219, filed on Sep. 9, 2016, now Pat. No. 10,146,067.

(51) Int. Cl.
   *G02C 7/10*      (2006.01)
   *G02B 27/01*     (2006.01)
   *G02C 9/00*      (2006.01)
   *G02C 7/16*      (2006.01)
   *G02C 9/04*      (2006.01)

(52) U.S. Cl.
   CPC .......... *G02C 7/10* (2013.01); *G02B 27/0172* (2013.01); *G02C 7/16* (2013.01); *G02C 9/00* (2013.01); *G02B 2027/0118* (2013.01); *G02B 2027/0141* (2013.01); *G02B 2027/0178* (2013.01); *G02C 7/101* (2013.01); *G02C 7/102* (2013.01); *G02C 9/04* (2013.01); *G02C 2200/08* (2013.01)

(58) Field of Classification Search
   CPC ... G02C 7/10; G02C 7/16; G02C 9/00; G02C 7/101; G02C 7/102; G02C 9/04; G02C 2200/08; G02B 27/0172; G02B 2027/0118; G02B 2027/0141; G02B 2027/0178
   USPC .............................................. 351/41, 44, 47
   See application file for complete search history.

(56) References Cited

U.S. PATENT DOCUMENTS

2012/0326948 A1* 12/2012 Crocco .................... G09G 5/00
                                                            345/7
2015/0091789 A1*  4/2015 Alzate ................ G02B 27/0101
                                                            345/156

* cited by examiner

*Primary Examiner* — Tuyen Tra

(57) ABSTRACT

An eye-protective shade for the Augmented Reality (AR) smart glasses is provided, including: an eye protection unit disposed in front of the AR smart glasses, wherein the eye protection unit is disposed with a pair of shading portions capable of filtering light, and the pair of the shading portions respectively correspond to a pair of semitransparent display portions disposed on the AR smart glasses, and the pair of shading portions are made of translucent material and/or opaque material; when reading digital information by use of the eye-protective shade along with the AR smart glasses, the eye-protective shade protects the user's eyeballs and the macula from direct light radiation while the peripheral retina is continuously in contact with external light sources. The present disclosure can change the user's reading habits and moderate visual fatigue when reading.

19 Claims, 11 Drawing Sheets

EYE-PROTECTIVE SHADE FOR AUGMENTED REALITY SMART GLASSES

CROSS REFERENCE TO RELATED APPLICATION

This application is a continuation of U.S. non-provisional patent application Ser. No. 15/261,219, filed on Sep. 9, 2016, the contents of which are incorporated by reference herein.

BACKGROUND

1. Technical Field

The present disclosure relates to an eye-protective shade for AR (Augmented Reality) smart glasses; in particular, it relates to an eye protection unit disposed in front of AR smart glasses which is used to improve human reading habits and thus moderate visual fatigue and deterioration of myopia.

2. Description of Related Art

It is generally believed by the ophthalmological community that prolonged periods of reading and writing and insufficient outdoor activities are main factors that cause visual fatigue and deterioration of myopia. When spending too much time indoors watching TV, reading, surfing the internet, and so on, the following four major causes may result in visual fatigue and deterioration of myopia: (1) prolonged ciliary muscle contraction, (2) prolonged convergence, (3) insufficient contact time with sunlight and (4) relative peripheral hyperopia.

In an uncorrected myopic eye, the image of a distant object comes to a focal point in front of the central area of the retina, but behind the peripheral area of the retina. The eye is centrally nearsighted, but actually farsighted at the peripheral retina. This relative peripheral hyperopia (RPH) could stimulate the deterioration of myopia. Conventional myopic eyeglasses only correct the central myopia but do not correct the relative peripheral hyperopia. When light focuses behind the retina, the eye's axial length increases to enable the light to focus on the surface of the retina, which causes deterioration of myopia.

When reading, using a cellphone, or watching TV, the eyeballs actively search the target screen. Once the distance between the eyeballs and the target screen is less than six meters, the ciliary muscle has to contract to adapt to the distance. The ciliary muscle contraction leads to visual fatigue and easily causes deterioration of myopia.

When reading or using electronic products, there is only one target screen. When reading in such a manner the eyeballs have to converge, that is, by the contraction of the medial rectus muscle. However, the contraction of the medial rectus muscle may cause high intraocular pressure, and the high intraocular pressure may cause elongation of the posterior segment of the eyeballs. Thus the growth of the anteroposterior diameter of the eyeballs results in myopia deterioration.

Australian clinical studies report that too little time for outdoor activities during the day and insufficient contact time with sunlight may gradually lead to deterioration of myopia.

As shown in FIG. 10, people like to read or use electronic products with their heads down, which may cause neck stiffness and shoulder soreness.

People like to read in a sitting posture with their heads down for prolonged periods; it is well-known that such a reading habit easily causes cardiovascular diseases and weakness of muscles, bones, joints, and so on.

When reading or using electronic products indoors or outdoors, visual fatigue occurs easily because the reading material or screens of the electronic products may make eyes suffer from stray light and/or reflected light.

When reading or using electronic products on a vehicle, such as an automobile or an airplane, the target screen is affected by the vehicle vibration, causing reading difficulty, visual fatigue, and dizziness.

In recent decades, there have been various training methods and equipment used to improve vision. For example, electronic imaging technology which can train the patient's ciliary muscle and an instrument which prompts the patient's eyeballs to focus on near and distant objects alternately, also to train the ciliary muscle. However, prevalent disadvantages of these conventional training methods and therapeutic instruments include complex structure, ineffectiveness, long and boring process of treatment, and so on. To lively young people and busy people, it is difficult to implement these training methods and equipment effectively.

U.S. Patent Publication No. 2012/0326948 ('948 patent) discloses an environmental-light filter removably coupled to an optical see-through head-mounted display (HMD) device, for blocking a desired amount of environmental light. However, when the environmental-light filter is coupled with the HMD device and covers user's eyes, it covers both a central and a peripheral retinal area. When the environmental light to the central retinal area is filtered, the filtering of the environmental light to the peripheral retinal area affects the user's vision to the surrounding environment, sunlight that could reach the user's eye would be reduced and some details in the environment may be difficult to be seen by the user. The filtering of the environmental light on the peripheral retinal area also generates a dark background for the user when viewing computer-generated images (CGIs) from the HMD device, because the central retinal area is responsible to read the CGIs and the peripheral retinal area is responsible to provide background. Therefore, although the environmental-light filter blocks the environmental light, the technical solution disclosed by '948 patent affects the user's vision on both the background environment and the CGIs, and would be inconvenient and dangerous when being used in dim light environment, i.e. dusk outdoor environment.

U.S. Patent Publication No. 2015/0091789 ('789 patent) discloses a pair of AR smart glasses with solar cells. Some of the solar cells may be used as a shading portion for filtering lights from an external environment, as disclosed in FIGS. 7 and 9 of '789 patent. However, the solar cells or the shading portion disclosed by '789 patent are not positioned on an optical path between the external environment and the central area of retina. Therefore, lights from the external environment may enter the central area of the retina.

In view of the above, the present disclosure provides an eye-protective shade for Augmented Reality (AR) smart glasses for blocking or reducing lights from an external light source from being radiated to a central retinal area of an eye. To sum up, the eye-protective shade provided by the present disclosure aims at effectively improving the shortcomings mentioned above when used in conjunction with AR smart glasses.

SUMMARY

The primary purpose of the present disclosure is to provide an eye-protective shade for Augmented Reality (AR) smart glasses. The eye-protective shade is disposed in front of the AR smart glasses, comprising a shading portion and an eye protection unit, wherein the eye protection unit is disposed with a pair of shading portions capable of filtering light, and the pair of the shading portions respectively correspond to a pair of semitransparent display portions disposed on the AR smart glasses, and the pair of shading portions are made of translucent material and/or opaque material; when reading digital information by use of the eye-protective shade along with the AR smart glasses, the eye-protective shade protects the user's eyeballs and the macula from direct light radiation from an external light source while the peripheral retina is continuously in contact with external light sources.

According to one exemplary embodiment of the present disclosure, an area of each of the pair of shading portions is disposed with a convex lens.

According to one exemplary embodiment of the present disclosure, an area of each of the pair of shading portions is disposed with a plane lens.

According to one exemplary embodiment of the present disclosure, the AR smart glasses comprise a host used to transmit data and a frame unit on which the pair of semitransparent display portions are disposed.

According to one exemplary embodiment of the present disclosure, the AR smart glasses comprise an interface for transmitting data and in communication with the semitransparent display portion.

According to one exemplary embodiment of the present disclosure, the interface comprises a host, a transmission unit, or the combination thereof.

According to one exemplary embodiment of the present disclosure, the host comprises a reading system installed with one or more categories of teaching materials comprising language, science, math, geography, history, physics, chemistry, art, and music.

According to one exemplary embodiment of the present disclosure, the eye protection unit is formed as an independent set of lenses, and the eye-protective shade is detachably disposed in front of a set of lenses of the AR smart glasses. The eye-protective shade comprises a light transmittable part disposed on a larger area of the eye protection unit, and a pair of shading portions disposed on a smaller area of the eye protection unit such that they correspond to the pair of semitransparent display portions disposed on the AR smart glasses.

According to one exemplary embodiment of the present disclosure, the eye protection unit comprises a set of regular lenses, a set of photochromic lenses, or a set of electrochromic liquid crystal lenses.

According to another exemplary embodiment of the present disclosure, an eye-protective shade for AR smart glasses is provided, including: a pair of AR smart glasses connected to a host or a smartphone used to transmit data, and a frame unit, wherein the frame unit is disposed with a pair of lenses, and each of the pair of lenses is disposed with a semitransparent display portion; an eye-protective shade comprising an eye protection unit in front of the AR smart glasses, the eye-protective shade comprising a light transmittable part disposed on a larger area of the eye protection unit, wherein the light transmittable part is used to enable the peripheral retina to continuously contact sunlight, and a pair of shading portions capable of filtering light disposed on a smaller area of the eye protection unit such that they correspond to the pair of semitransparent display portions, wherein the pair of shading portions are made of translucent material and/or opaque material; and a reading system installed with teaching material selected from a group comprising language, science, math, geography, history, physics, chemistry, art, and music.

According to another exemplary embodiment of the present disclosure, an eye-protective shade disposable on a pair of AR smart glasses is provided, comprising: an eye protection unit; and a shading portion disposed on a portion of the eye protection unit. Wherein when the eye-protective shade is disposed on the pair of AR smart glasses and the pair of AR smart glasses are worn on a subject, the shading portion is disposed on an optical path between an external light source and a central retinal area of an eye of the subject for blocking or reducing a light from the external light source from being radiated to the central retinal area.

According to another exemplary embodiment of the present disclosure, an eye-protective shade disposable on a pair of AR smart glasses is provided, comprising: an eye protection unit; and a shading portion disposed on a part of the eye protection unit. Wherein when the eye-protective shade is disposed on the pair of AR smart glasses and the pair of AR smart glasses are worn on a user, the shading portion is disposed on an optical path between an external light source and a central retinal area of an eye of the user for blocking or reducing a light from the external light source from being radiated to the central retinal area.

According to one exemplary embodiment of the present disclosure, the shading portion is a shading sheet.

According to another exemplary embodiment of the present disclosure, a pair of AR smart glasses is provided, comprising: a frame unit comprising a lens, the lens comprising a semitransparent display portion; an interface for transmitting data and in communication with the semitransparent display portion; and an eye-protective shade detachably coupled to the pair of AR smart glasses. The eye-protective shade comprises an eye protection unit, and a shading portion disposed on a portion of the eye protection unit. The shading portion corresponds to the semitransparent display portion and the shading portion is disposed on an optical path between an external light source and a central retinal area of an eye for blocking or reducing a light from the external light source from being radiated to the central retinal area.

According to one exemplary embodiment of the present disclosure, when the eye protection unit is coupled to the pair of AR smart glasses, the lens is partially covered by the shading portion.

According to one exemplary embodiment of the present disclosure, the pair of AR smart glasses further comprises a convex lens, wherein when the eye protection unit is disposed on the pair of AR smart glasses, a light from the external light source is corrected by the convex lens to focus in front of a peripheral retinal area of the eye.

According to another exemplary embodiment of the present disclosure, a pair of AR smart glasses is provided, comprising: a frame unit comprising a lens, the lens comprising a semitransparent display portion; an interface for transmitting data and in communication with the semitransparent display portion; and an eye-protective shade integrally disposed on the pair of AR smart glasses. The eye-protective shade comprises an eye protection unit, and a shading portion disposed on a portion of the eye protection unit. Wherein the shading portion blocks or reduces a light from an external light source from being radiated to the central retinal area.

According to one exemplary embodiment of the present disclosure, the lens is partially covered by the shading portion.

According to one exemplary embodiment of the present disclosure, the AR smart glass further comprises a convex lens, wherein a light from the external light source is corrected by the convex lens to focus in front of the peripheral retinal area of the eye.

According to one exemplary embodiment of the present disclosure, the eye-protective shade further comprises a light transmittable part disposed on an outer periphery of the shading portion for allowing a peripheral retinal area of the eye to be continuously in optical contact with the light from the external light source.

According to another exemplary embodiment of the present disclosure, a pair of AR smart glasses is provided, comprising: a frame unit comprising a lens, the lens comprising an opaque display portion and a light transmittable part disposed on an outer periphery of the opaque display portion; and an interface for transmitting data an in communication with the opaque display portion. When the pair of AR smart glasses is worn on the user, the opaque display portion is disposed on an optical path between the external light source and the central retinal area of the eye of the user for blocking or reducing the light from the external light source from being radiated to the central retinal area. The light transmittable part is disposed on another optical path between the external light source and a peripheral retinal area of the eye for allowing the light from the external light source to be in continuous contact with the peripheral retinal area.

According to another exemplary embodiment of the present disclosure, a pair of AR smart glasses is provided, comprising a shading portion; a lens disposed corresponding to the shading portion. When the eye-protective shade is disposed on the pair of augmented reality smart glasses and the pair of augmented reality smart glasses is worn on a user, the shading portion is disposed on an optical path between an external light source and a central retinal area of an eye of the user.

According to one exemplary embodiment of the present disclosure, the lens is a convex lens.

According to one exemplary embodiment of the present disclosure, the lens is a plane lens.

When using the present disclosure to read digital information, the eye-protective shade protects the user's eyeballs and the central retinal area (macula) from a direct light of an external light source while the peripheral retina is continuously in contact with sunlight and the user can see the surroundings clearly. Specifically, the shading portion of the eye-protective shade is disposed on an optical path between the external light source and the central retinal area. The direct light from the external light source to the central retinal area is thus blocked or reduced by the shading portion. When using the present disclosure to read, the user's head and neck can move and rotate freely, so neck stiffness and shoulder pain can be avoided. In addition, by using the present disclosure, the user can read while walking instead of being in the sitting posture for a prolonged duration, so as to avoid cardiovascular diseases and weakness of limbs, and to moderate visual fatigue, and so on.

To sum up, by using the present disclosure to read, a person's reading habits can be positively changed, and causes of deterioration of myopia and visual fatigue, including prolonged ciliary muscle contraction, prolonged convergence, and insufficient contact time with sunlight, can be effectively prevented. If the eye protection unit of the present disclosure incorporates convex lenses, it can further resolve the problem of relative peripheral hyperopia.

In addition, the present disclosure can achieve the advantages as follows.

1. The images from the screen of the AR smart glasses are actively projected onto the retina, and therefore the user sees the target screen without actively searching it. In addition, the ciliary muscle is in a state of relaxation, thereby moderating visual fatigue. Thus it is a revolutionary advancement for the ciliary muscle to be in a relaxed state even during near reading.

2. The convex lenses respectively disposed on the pair of shading portions can transform the relative peripheral hyperopia into the relative peripheral myopia to moderate the myopic deterioration. It has been proved that deterioration of myopia in schoolchildren can be successfully slowed down by orthokeratology lenses, which use the same mechanism.

3. By means of a pair of display portions disposed correspondingly on the eyeballs, the eyeballs are not in convergence, the medial rectus muscle is in a state of relaxation, and the intraocular pressure is moderated as the medial rectus muscle is not in contraction, thereby slowing down the myopic deterioration. It is also a revolutionary advancement for the eyeballs to not have to converge even during nearsighted work.

4. When using the present disclosure to read, the user's head and neck can move and rotate freely, so neck stiffness and shoulder pain can be avoided.

5. Users can read comfortably even during locomotion. Because the AR smart glasses can be securely worn, the target screen moves in sync with the eyeballs and thus the target image is stable to the user, even when travelling in a vehicle or while walking. Hence, usage of the current disclosure can moderate the problems of muscles, bones, joints, and cardiovascular diseases by allowing users to avoid the sitting posture for prolonged periods.

6. Outdoor use: the eye-protective shade provided by the present disclosure can protect the eyeballs and macula from direct light radiation when the user is reading, by use of the current disclosure, outdoors. As long as the weather condition permits, outdoor reading will become a pleasant thing. In addition, the field of view can reach 180 degrees, thereby improving the narrow field of view indoors so as to moderate visual fatigue. The light transmittable part of the eye-protective shade of the present disclosure provides a bright background for reading computer-generated images (CGIs) in daytime and nighttime, as long as an external light source is present, whereas the external light source can be sunlight or artificial light. The bright background is generally considered to be psychologically beneficial to human mind and physiologically beneficial to the human eyes.

7. Big target screen. The further the distance between the eyeballs and the target screen, the bigger the screen appears to the user. Take a 23° viewing angle as an example, when the distance between the eyeballs and the target screen is 10 meters, the screen appears as 160-inches, and when the distance is 20 meters, the screen appears as 320-inches. The big target screen substitutes for the small screens of books, computers, TV, mobile phones, and so on. The long distance viewing replaces the conventional manner of short distance reading. The dual screen replaces the single screen, and the image can be presented in a three-dimensional manner. Thus it moderates visual fatigue and promotes reading.

8. Reading is not affected by vibration. When reading on moving vehicles, such as cars, trains, and airplanes, the AR smart glasses can move synchronously with the eyeballs, thereby enabling the target screen to remain stable relative to the user, hence avoiding visual fatigue.

9. Exposure to sunlight. A large light-transmittable area is disposed on the outer peripheral of the pair of shading portions, and this design enables the peripheral retina to contact sunlight. When wearing the AR smart glasses of the present disclosure outdoors, the sunlight is projected into the peripheral retina, and would become a bright background (as shown in FIG. 9) in the user's vision when viewing the CGIs generated by the AR smart glasses. By contacting sunlight on average for two to three hours a day, the deterioration of myopia can be moderated. The bright background is generally considered to be psychologically beneficial to human mind and physiologically beneficial to the human eyes.

10. The methods of educating and learning can be changed. The dual display screen of the AR smart glasses can present 2D and 3D effects, and 2D and 3D images and videos will gradually replace conventional textbooks. In addition, with the increasing ubiquity of e-books, the big target screen will replace the traditional pages of textbooks and provide novel ways of learning, thereby making learning more fun.

In order to further understand the techniques, means and effects of the present disclosure, the following detailed descriptions and appended drawings are hereby referred to, such that and through which the purposes, features and aspects of the present disclosure can be thoroughly and concretely appreciated; however, the appended drawings are merely provided for reference and illustration, without any intention to be used for limiting the present disclosure.

BRIEF DESCRIPTIONS OF THE DRAWINGS

The accompanying drawings are included to provide further understanding of the present disclosure and are incorporated in, and constitute a part of, this specification. The drawings illustrate exemplary embodiments of the present disclosure and, together with the descriptions, serve to explain the principles of the present disclosure.

DESCRIPTIONS OF THE EXEMPLARY EMBODIMENTS

Figure 1:
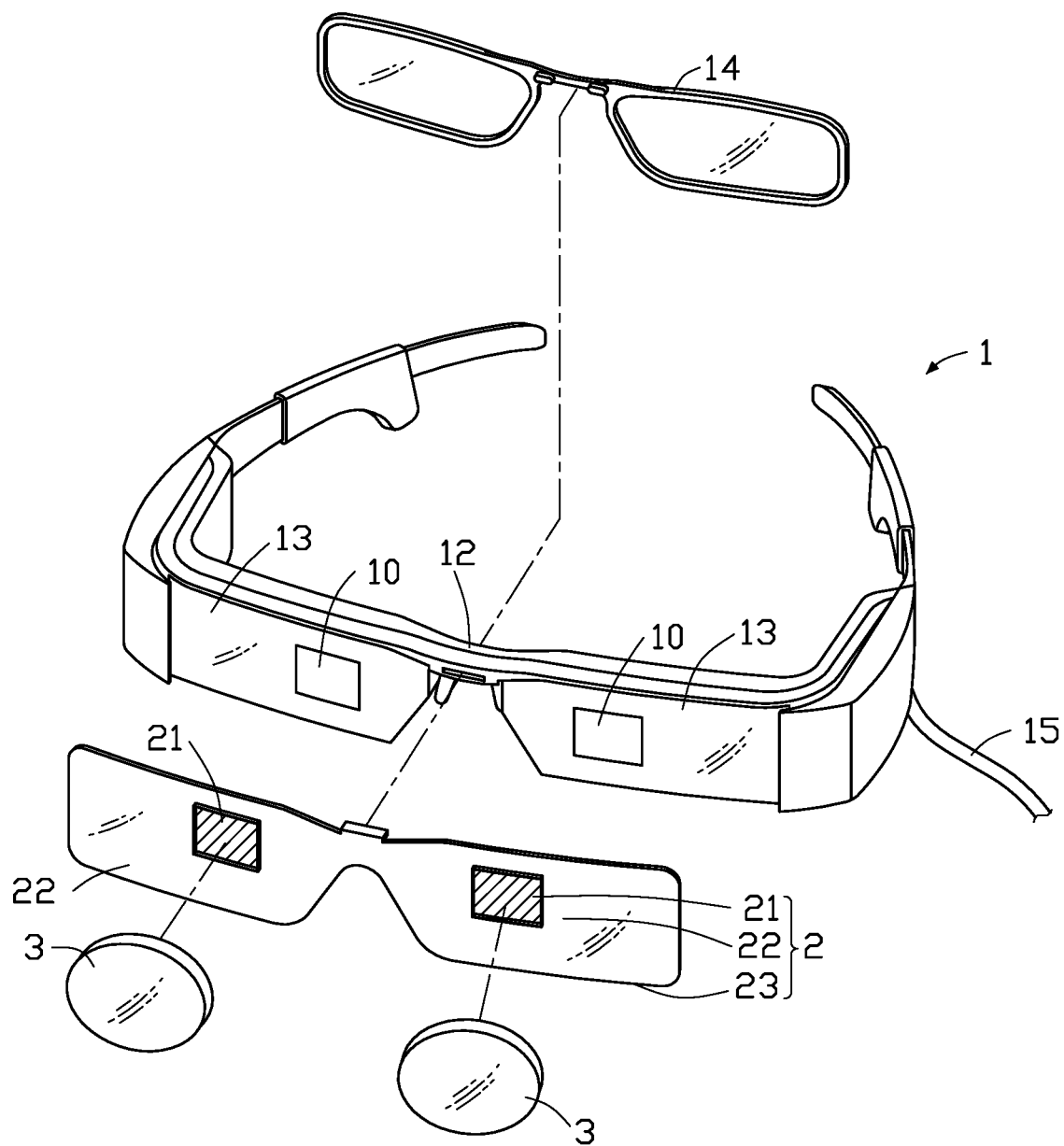
FIG. 1 is a three-dimensional diagram of a pair of AR smart glasses of the present disclosure and a pair of prescription glasses.

Reference will now be made in detail to the exemplary embodiments of the present disclosure, examples which are illustrated in the accompanying drawings. Wherever possible, the same reference numbers are used in the drawings and the descriptions to refer to the same or like parts.

Please refer to FIG. 1 to FIG. 6 together. The present disclosure provides an augmented reality (AR) smart glasses 1 which includes an eye-protective shade 2 disposed in front of the AR smart glasses 1, wherein the eye-protective shade 2 has an eye protection unit 23, a pair of shading portions 21 capable of filtering, blocking, or reducing light, and a light transmittable part 22 disposed on an outer periphery of the shading portion 21. The pair of shading portions 21 respectively correspond to a pair of semitransparent display portions 10 disposed on the AR smart glasses 1, and the shading portions 21 are disposed on the eye protection unit 23. The semitransparent display portion 10 is a device capable of displaying computer-generated images (CGI) to an eye of the user.

Figure 3:
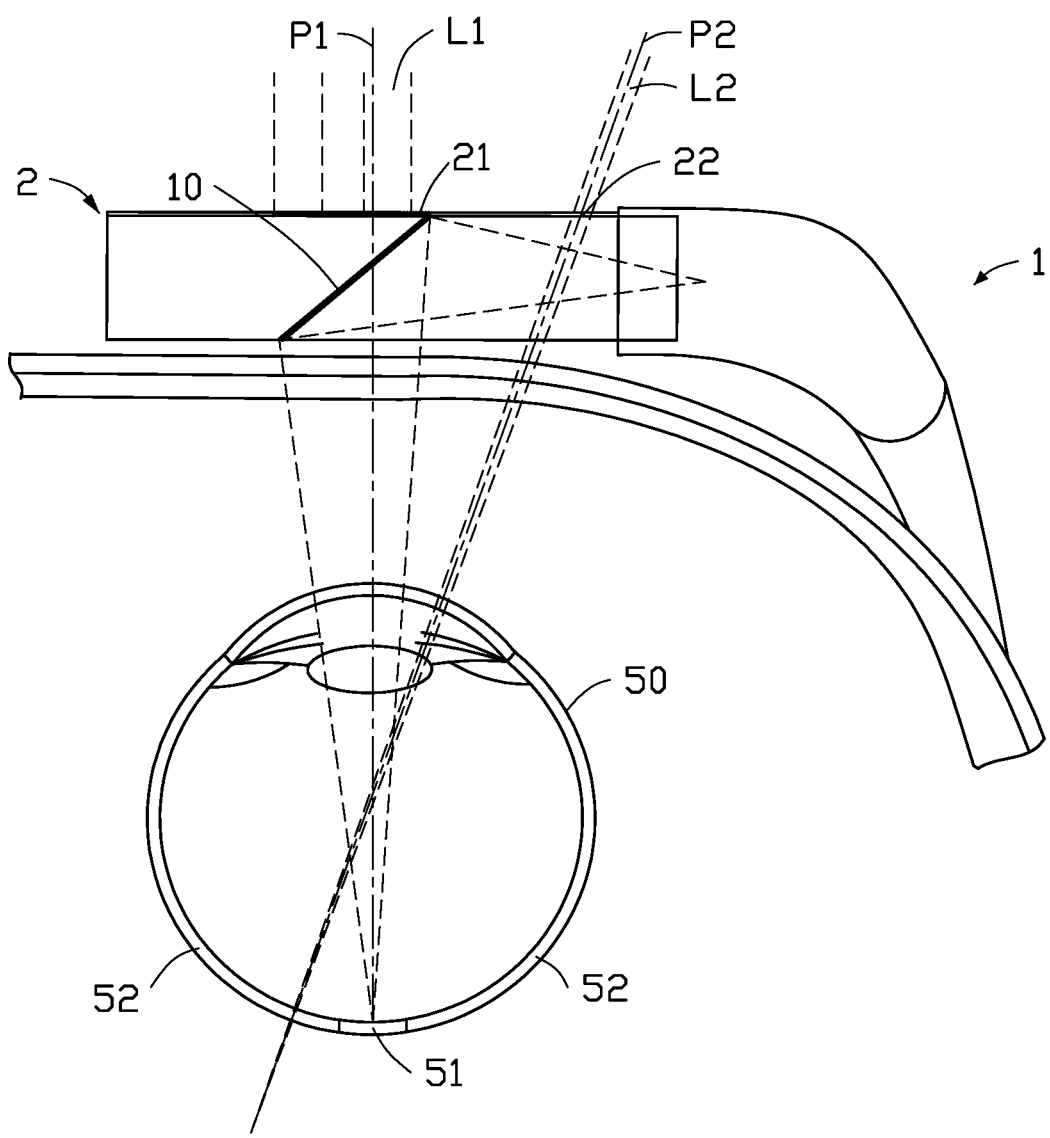
FIG. 3 is a diagram of the eye of the user and the another pair of AR smart glasses of the present disclosure. A light from an external light source was focused on the rear of the peripheral retina.
Figure 4:
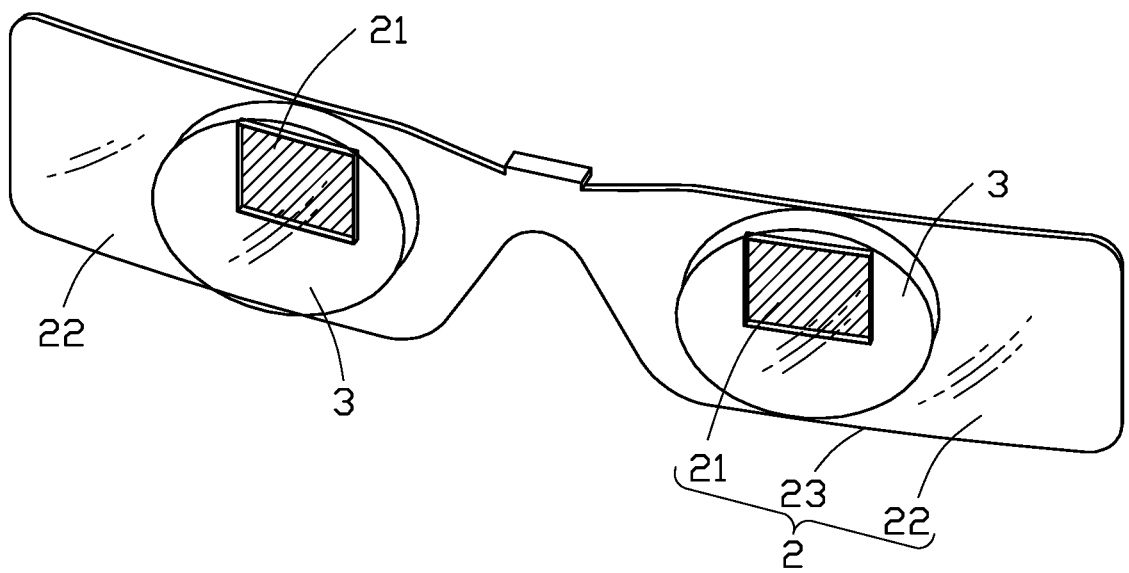
FIG. 4 is a three-dimensional diagram illustrating the eye-protective shade and a pair of convex lenses of the present disclosure.
Figure 9:
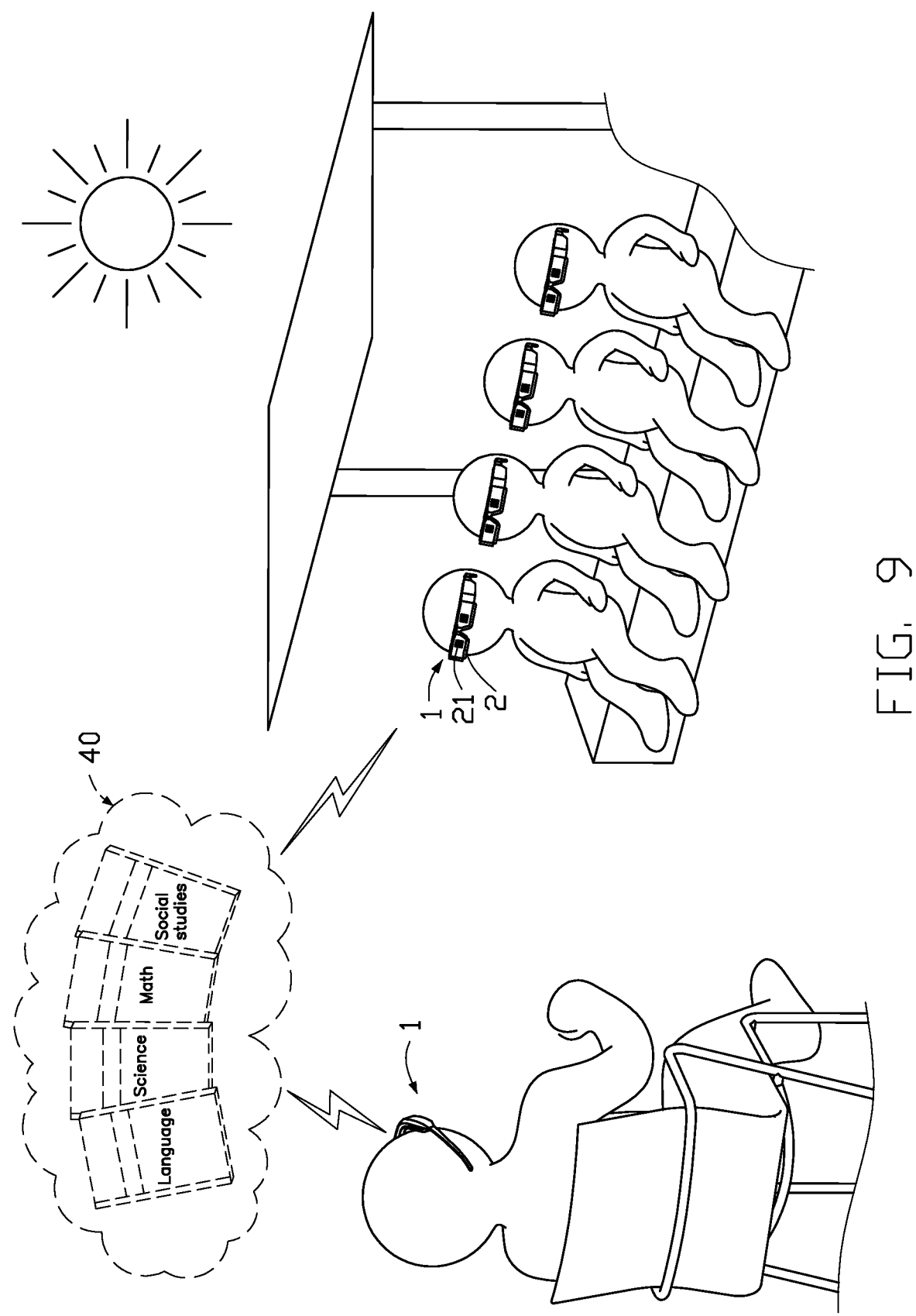
FIG. 9 is a schematic illustration of an application of the present disclosure. The application is directed to outdoor learning.

Referring to FIG. 3, when the AR smart glasses 1 is worn on the user, the shading portion 21 is disposed on an optical path P1 between an external light source and a central area of the retina (macula) 51 of an eye 50 of the user. Therefore, the shading portion 21 filters, reduces, or blocks a light L1 from the external light source, thereby the central area of the retina (macula) 51 of the eye 50 would receive less or no light from the external light source. The external light source could be sunlight, or artificial lighting. With the light from the external light source is reduced or blocked, the macula 51 of the user would be more effective to receive the CGI. Also, an optical path P2 between the external light source and a peripheral retinal area 52 is not blocked, and another light L2 from the external light source passes through the light transmittable part 22 and reaches the peripheral retinal area 52 without being blocked, the peripheral retinal area 52 of the user is able to receive sunlight, the user's vision to the surrounding environment is not affected, and the AR smart glasses of the present disclosure is capable of being used outdoors. The light transmittable part 22 provides a bright background for reading CGIs in daytime (as shown in FIG. 9) and nighttime, as long as the external light source is present, whereas the external light source can be sunlight or artificial light. The bright background is generally considered to be psychologically beneficial to human mind and physiologically beneficial to the human eyes.

In practice, the pair of shading portions 21 of the eye protection unit 23 can be made to suit the indoor/outdoor light intensity, thereby enabling the semitransparent display portions 10 of the AR smart glasses 1 to become partially transparent or totally opaque depending on the light intensity.

Figure 7:
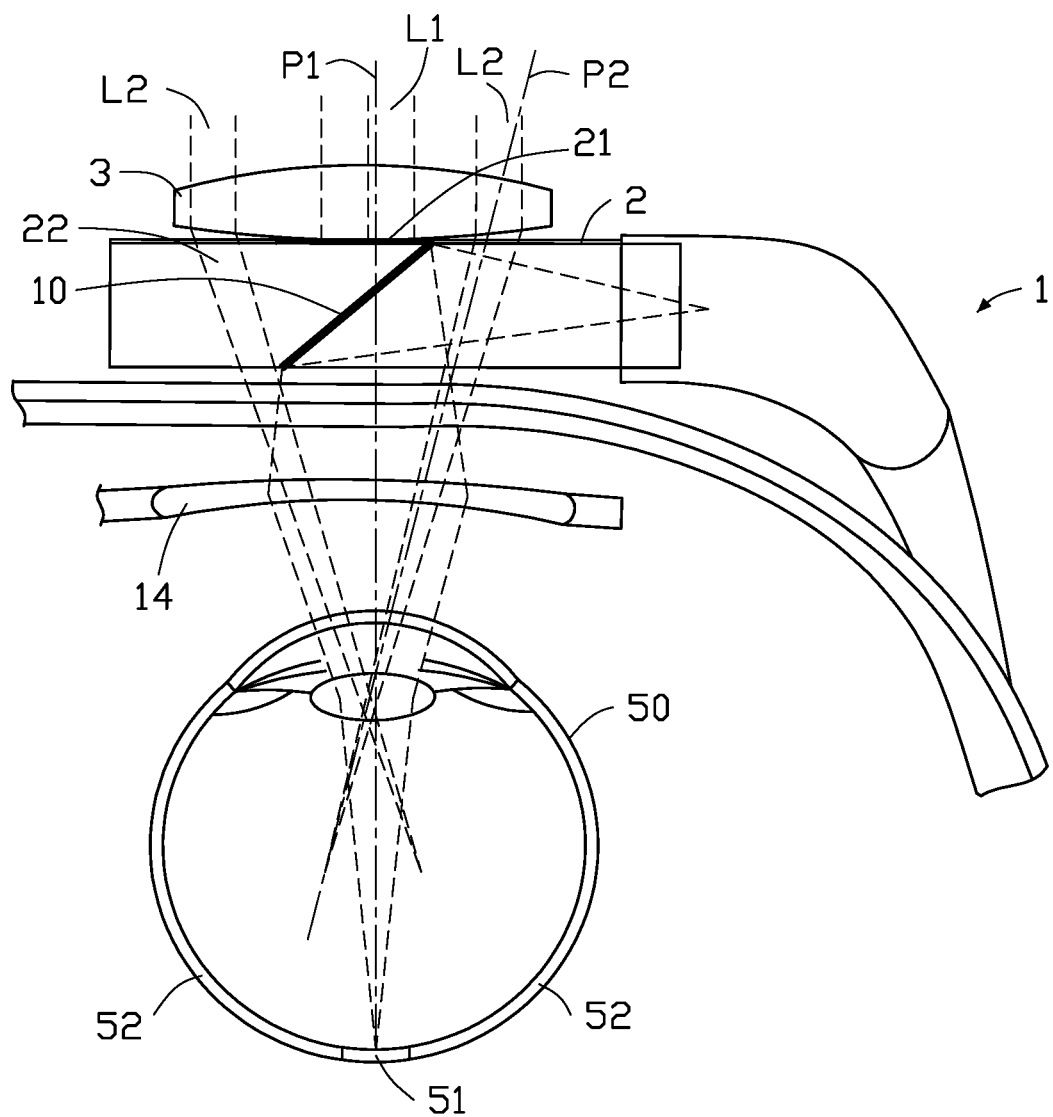
FIG. 7 is a schematic diagram of an eye of the user, the pair of AR smart glasses of the present disclosure, and the pair of prescription glasses.
Figure 8:
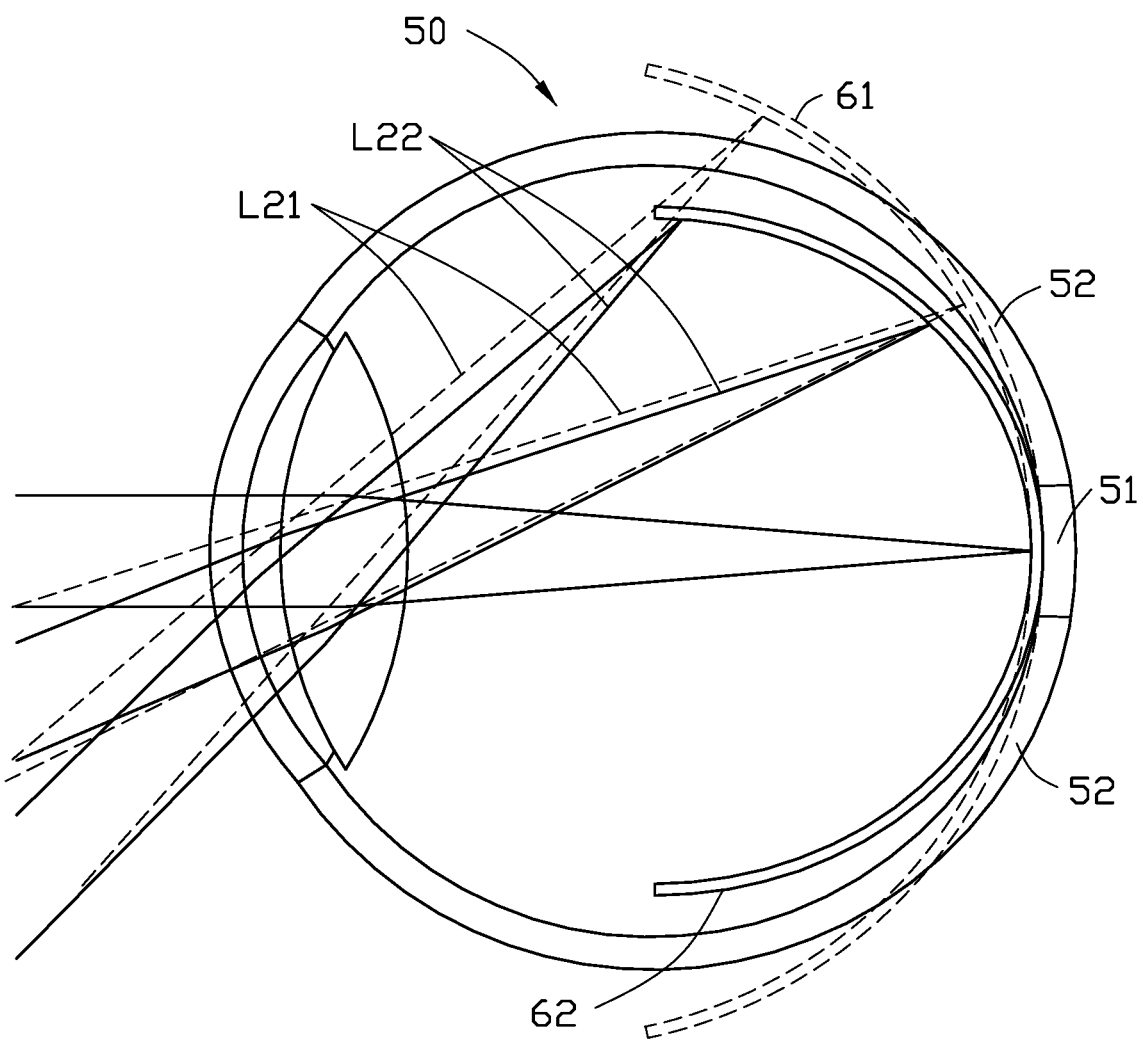
FIG. 8 is a schematic diagram illustrating the corrected focus by using the AR smart glasses of the present disclosure. The light from the external light source was focused on the rear of the peripheral retina, but is corrected by the convex lens of the AR smart glasses to focus in front of the retina.

Referring to FIGS. 7 and 8, a pair of convex lenses 3 are disposed corresponding to the pair of shading portions 21. A light transmittable part is disposed on an outer periphery of the shading portion 21. When lights from the pair of semitransparent display portions 10 focus on the macula 51, the light L2 from the external light source focuses in front of the peripheral retinal area 52. The shading portion 21 is disposed on the optical path P1 between the external light source and the central retinal area 51, therefore the light L1 from the external light source is filtered, reduced, or blocked by the shading portion 21. If the shading portion 21 is composed of an opaque material, then the light L1 does not radiate to the central retinal area 51; if the shading portion 21 is composed of a partially transparent material, then the light L1 may be filtered or reduced, therefore some of the light L1 may reach the central retinal area 51. The optical path P2 between the external light source and the peripheral retinal area 52 is not blocked, therefore the light L2 from the external light source may reach the peripheral retinal area 52. Here, the area of the pair of convex lenses 3 does not affect the user's vision, and the size of the area is not limited. The pair of convex lenses 3 may be lenses of any diopter used to change the relative peripheral hyperopia to the peripheral myopia. Alternatively, for users with normal vision, the pair of convex lenses 3 may be replaced by plane lenses.

When the eye protection unit 23 is combined with plane lenses, the following advantages are achieved: the ciliary muscle is in a state of relaxation, the eyeballs are not in convergence, and the peripheral retina 52 is continuously in contact with sunlight. In addition, when the eye protection unit 23 is combined with the convex lenses 3, it can change the focal length of the image in the peripheral retina 52 from the rear of the retina to the front of the retina. Hence, a user may wear the AR smart glasses 1 and the eye-protective shade 2 for reading the digital information. The combination of the AR smart glasses 1 and the eye protective shade 2 can protect the eye 50 and the central area of the retina (macula) 51 from direct light radiation from external light sources, while the peripheral retina 52 is continuously in contact with external light sources, and the user would be able to see the surroundings clearly. Thus, when the light from the pair of semitransparent display portions 10 focuses on the macula 51, the light from the external light source passes through the light transmittable part 22 and focuses in front of the peripheral retinal area. However, if the refractive error is zero, the present disclosure can also enable the eye's extrinsic muscles to be in a natural state of relaxation, the ciliary muscle is not in contraction, effectively avoiding visual fatigue and development of myopia.

Figure 2:
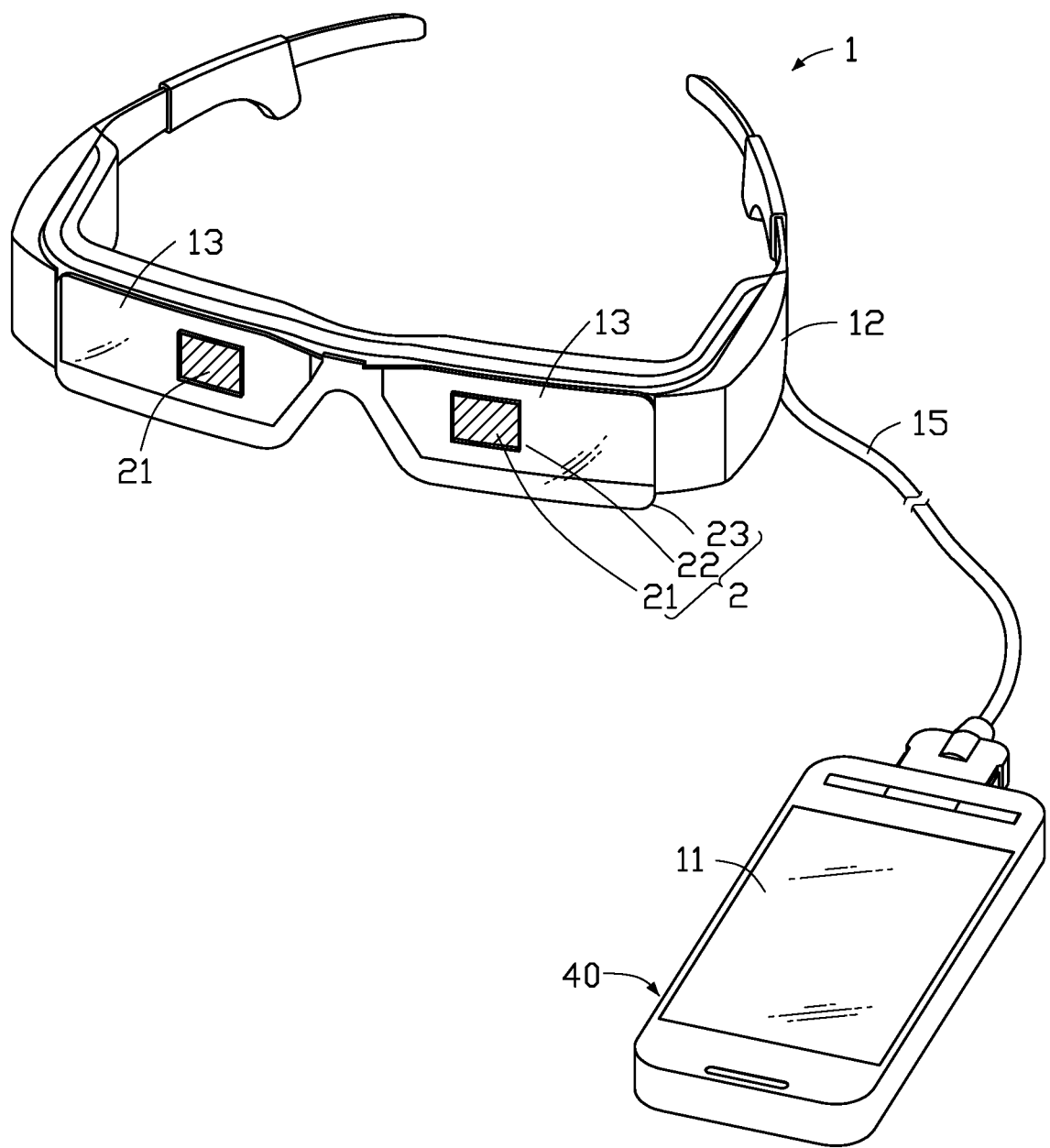
FIG. 2 is a three-dimensional diagram illustrating another pair of AR smart glasses of the present disclosure, connected to a host.
Figure 5:
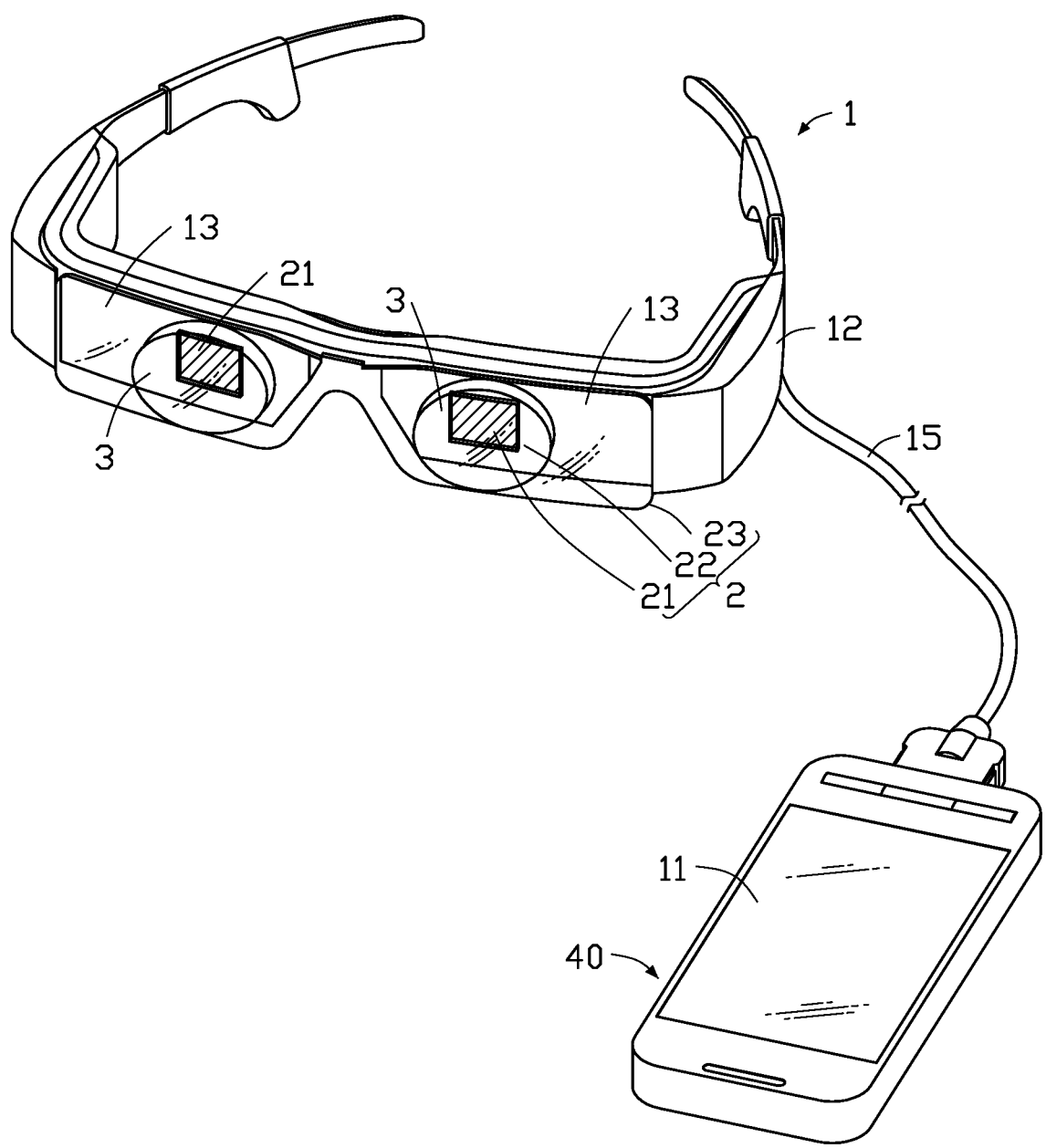
FIG. 5 is a three-dimensional diagram illustrating the pair of AR smart glasses of the present disclosure, connected to the host.
Figure 6:
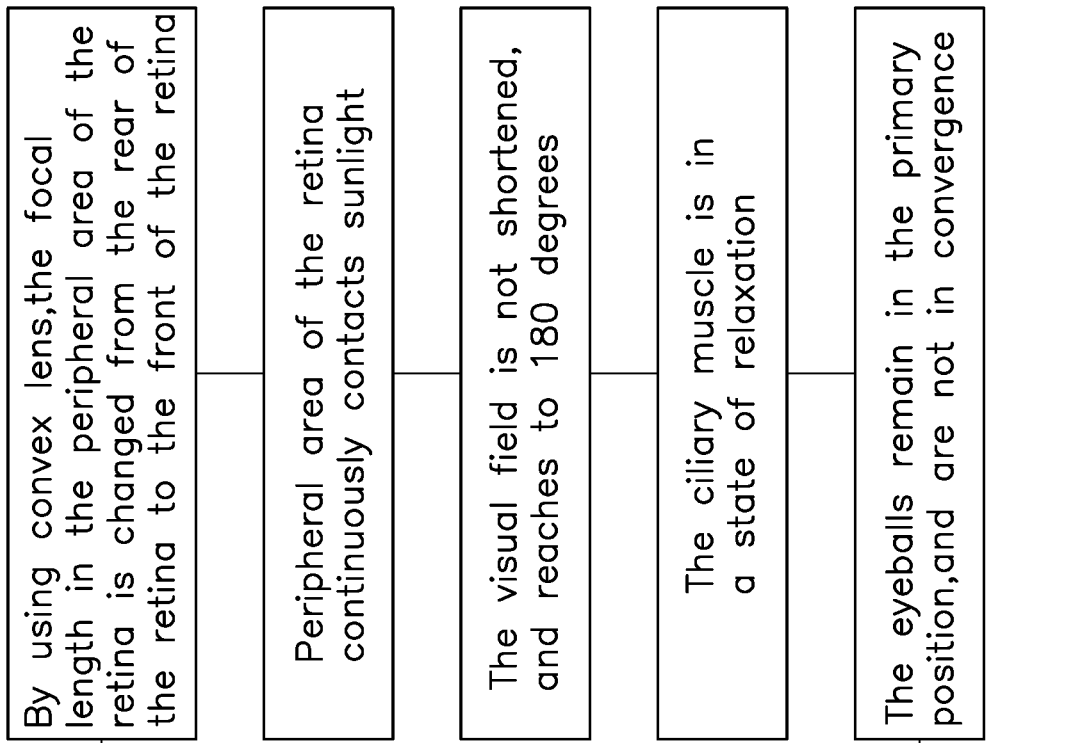
FIG. 6 is a flow chart of an application of the present disclosure.
Figure 6:
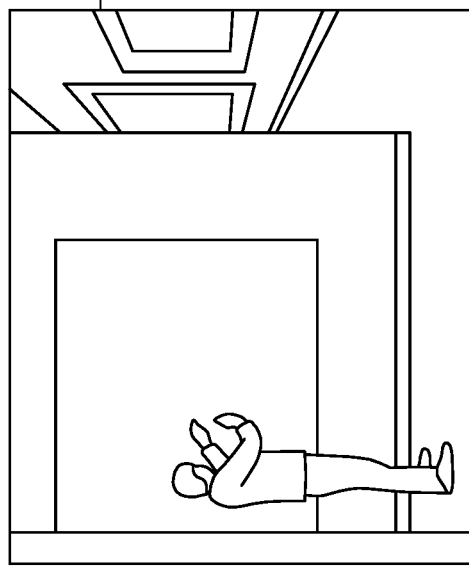
Figure 6:
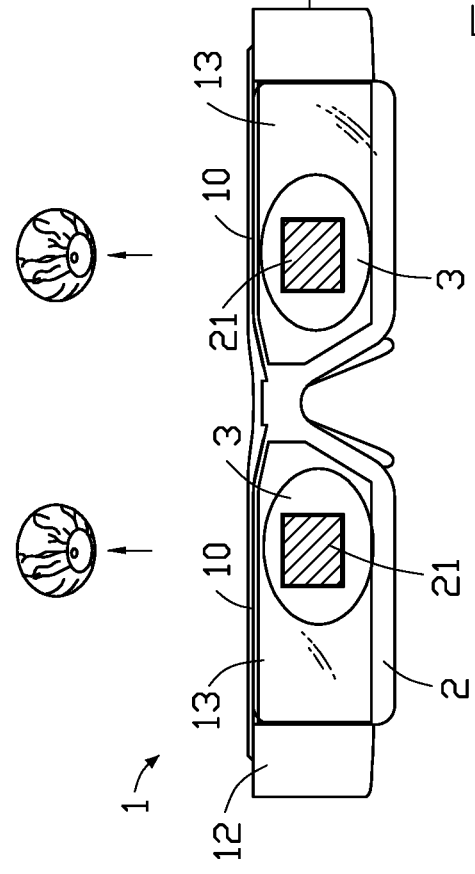

In FIGS. 2 and 5, the AR smart glasses 1 comprise an interface for transmitting data, a pair of prescription glasses 14, and a frame unit 12. The interface is in communication with the semitransparent display portion 10, transmits information to form the CGIs being displayed to the semitransparent display portion 10, and may comprise a host 11 or a smartphone for transmitting data, a transmission unit 15 for connecting the host 11 with the AR smart glasses 1, or a combination thereof. The transmission unit 15 can be a wireless connection module or a cable. The host 11 can be a CPU, MPU, tablet, laptop, or computer. Two sides of the frame 12 are respectively disposed with a lens 13, and each lens 13 is disposed with a semitransparent display portion 10. When using the AR smart glasses 1, the following advantages can be achieved, including: the eyeballs are not in convergence, the ciliary muscle is in a state of relaxation, the visual field is not shortened and can reach 180°, and the focal length of the image in the peripheral retina 52 is changed from the rear of the retina to the front of the retina.

The eye protection unit 23 may be a set of lenses disposed in front of the set of lenses 13 of the AR smart glasses 1, and include a light transmittable part 22 disposed on a large area of the eye protection unit 23, wherein the light transmittable part 22 is used to enable the retina to be in continuous contact with sunlight, and a pair of shading portions 21 disposed on a smaller area of the eye protection unit 23 such that they correspond to the pair of semitransparent display portions 10, wherein the pair of shading portions 21 are made of translucent material and/or opaque material.

Referring to FIG. 7, the pair of convex lenses 3 are disposed corresponding to the pair of shading portions 21. When the lights from the pair of semitransparent display portions 10 focus on the macula 51, the light L2 from the external light source passes through the light transmittable part 22, and focuses in front the peripheral retinal area of the retina. Here, the area of the pair of convex lenses 3 does not affect the user's vision and the size of the area is not limited. The pair of convex lenses 3 may be lenses of any diopter used to change the relative peripheral hyperopia to the peripheral myopia. Alternatively, to the user with normal vision, the pair of convex lenses 3 may be replaced by plane lenses. As to people suffering from presbyopia, the pair of convex lenses 3 are disposed on the eye protection unit 23 to moderate visual fatigue, and to see near objects clearly.

In a preferred embodiment, the eye-protective shade 2 is integrally disposed on the AR smart glasses 1 (not shown), or detachably disposed on the AR smart glasses 1 (as shown in the figures). In addition, the eye protection unit 23 can be a set of regular lenses, a set of photochromic lenses, or a set of electrochromic liquid crystal lenses. The set of regular lens is transparent under the sunlight.

A method of disposing the eye-protective shade 2 on the AR smart glasses 1 is as follows.

1. In the manufacturing process, the pair of semitransparent display portions 10 are transformed into a pair of opaque display portions to form a pair of shading portions so as to form the eye-protective shade 2. The pair of convex lenses 3 are disposed corresponding to the pair of shading portions 21. When the lights from the pair of semitransparent display portions 10 focuses on the macula 51, the light from the external light source passes through the light transmittable part 22 and focuses in front of the peripheral retinal area 52. Here, the area of the pair of convex lenses 3 does not affect the user's vision, and the size of the area is not limited. The pair of convex lenses 3 may be lenses of any diopter used to change the relative peripheral hyperopia to the peripheral myopia. Alternatively, to the user with normal vision, the pair of convex lenses 3 may be replaced by plane lenses.

2. A shading sheet can be disposed in front of each of the semitransparent display portions 10 as the shading portion 21. In addition, the pair of convex lenses 3 are disposed corresponding to the pair of shading portions 21. When the lights from the pair of semitransparent display portions 10 focus on the macula 51, the light from the external light source passes through the light transmittable part 22 and focus in front of peripheral retinal area 52. Here, the area of the pair of convex lenses 3 does not affect the user's vision and the size of the area is not limited. The pair of convex lenses 3 may be lenses of any diopter used to change the relative peripheral hyperopia to the peripheral myopia. Alternatively, to the user with normal vision, the pair of convex lenses 3 may be replaced by plane lenses (as shown in FIG. 2).

3. Please refer to FIG. 5. People suffering from myopia or presbyopia can use the pair of convex lenses 3. The pair of convex lenses 3 is integrally disposed with the eye-protective shade 2 or disposed in front of the eye-protective shade 2, but the present disclosure is not limited thereto. Thus the diopter of people suffering from myopia is not increased easily, and the people suffering from presbyopia can see images of objects clearly without the use of reading glasses.

As shown in FIG. 7, the pair of semitransparent display portions 10 is disposed about 2 cm in front of the eye 50 and can directly project the image onto the retina, and the retina receives the image without actively searching the target image. At this point in time, the ciliary muscle is not in contraction but in a state of relaxation, thereby moderating visual fatigue and deterioration of myopia.

Please refer to FIG. 7 and FIG. 8. When using the eye-protective shade 2 and the pair of convex lenses 3 of FIG. 7 to read the digital information, the eye 50 and central area of the retina (macula) 51 can be protected from direct light radiation while the peripheral area of the retina 52 is continuously in contact with external light sources, and the user can see the surroundings clearly. Thus the light from the pair of semitransparent display portions 10 focuses on the macula 51, and the light L2 passing through the light transmittable part 22 from the external light source focuses in front of the retina at the same time. Before using the pair of convex lenses 3, lights L21 from the external light source originally focus on an image shell 61 behind the retina, as the dotted line shown in FIG. 8. However, when the pair of convex lenses 3 is used, the lights L21 are corrected into lights L22 to focus on another image shell 62 in front of the retina as solid lines shown in FIG. 8. When the user uses the present disclosure to read, the pair of semitransparent display portions 10 enable the eye 50 not have to converge, so as to avoid high intraocular pressure caused by the medial rectus muscle contraction, thereby moderating deterioration of myopia.

When the user uses the present disclosure to read outdoors, the visual field can reach 180°. Under these circumstances, the eyeballs are in a comfortable state and the retina is adequately in contact with sunlight, which moderates the deterioration of myopia.

As the present disclosure has simple structure, it works easily with the AR smart glasses 1, thereby promoting their utility.

When the user travels by mass transit system such as buses, trolleybuses, commuter rails, and so on, the target screen is not affected by movement of the vehicle because the AR smart glasses 1 can move synchronously with the user's eyeballs, thereby enabling the user to read the target screen clearly so as to avoid visual fatigue.

Figure 10:
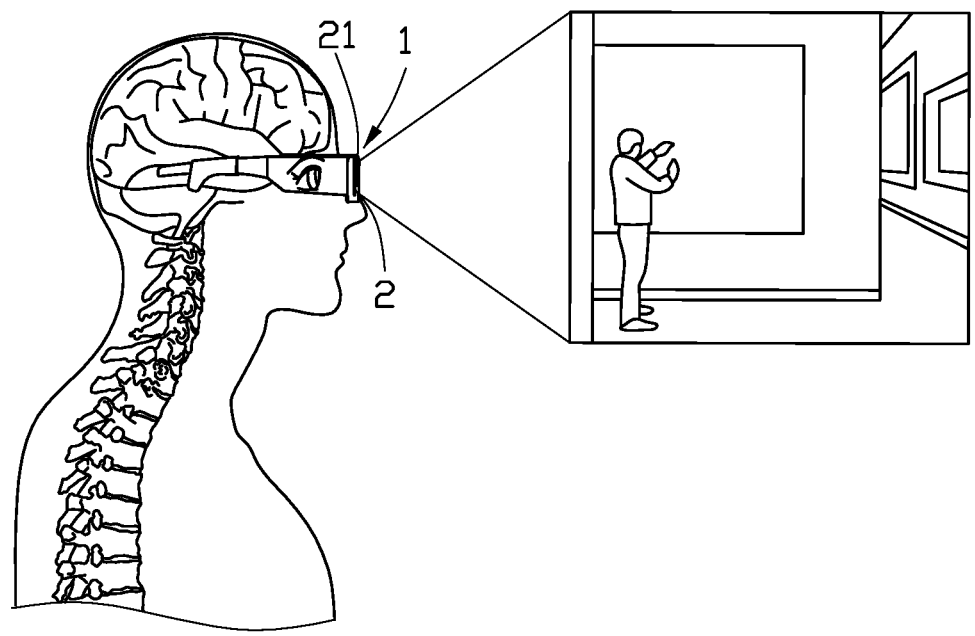
FIG. 10 is a schematic illustration of an application of the present disclosure. The user is in a head-up position.
Figure 11:
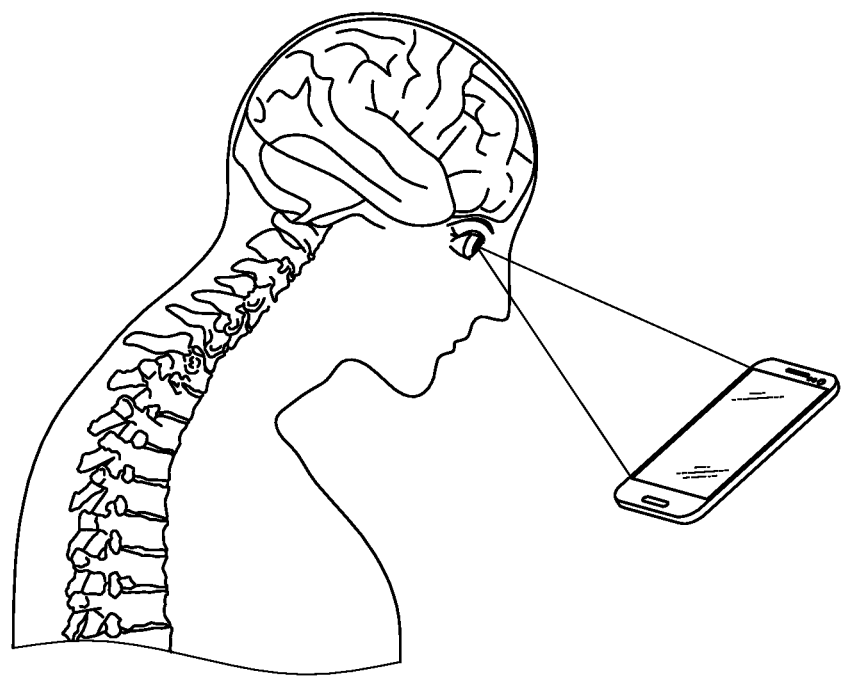
FIG. 11 is a schematic illustration of a common head-down posture of the user.

Please refer to FIG. 10. As shown in the figure, by using the present disclosure, the user can rotate and move his/her head and neck freely, so as to avoid neck stiffness and shoulder pain. The common head-down position as illustrated in FIG. 11 is corrected by the using the AR smart glasses of the present disclosure.

In practice, a reading system 4 can be installed in the host 11 of the AR smart glasses 1 or it can work with cloud computing. The reading system 4 comprises one or more categories of teaching materials comprising language, science, math, geography, history, physics, chemistry, art, or music, but is not limited thereto. By using the reading system 4, teachers and students are not limited to indoor classrooms, and the location of instruction can be anywhere including outdoor environments, which would be beneficial in prevention of nearsightedness.

In addition, when the present disclosure is used for instruction, conventional textbooks can be replaced by teaching materials using 2D or 3D pictures or films, thereby promoting interest in learning.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. An eye-protective shade for augmented reality (AR) smart glasses, comprising:
    an eye protection unit disposed in front of the AR smart glasses, and the eye protection unit is made of a photochromic lens; and
    a shading portion disposed on a part of the eye protection unit;
    wherein the shading portion is made of a translucent material or an opaque material, and the shading portion corresponds to a semitransparent display portion of the AR smart glasses.

2. A pair of AR smart glasses, comprising:
    a frame unit comprising a lens, the lens comprising a semitransparent display portion; and
    the eye-protective shade of claim 1, detachably or integrally disposed on the pair of AR smart glasses.

3. The pair of AR smart glasses of claim 2, further comprises a host or a smartphone, the host or the smartphone comprises a reading system installed with one or more categories of teaching materials comprising language, science, math, geography, history, physics, chemistry, art, or music, and the reading system can work with cloud computing.

4. A pair of AR smart glasses, comprising:
    a frame unit comprising a lens, the lens comprising a semitransparent display portion;
    wherein the semitransparent display portion is transformed into an opaque display portion to form a shading portion.

5. The pair of AR smart glasses of claim 4, further comprises a host or a smartphone, the host or the smartphone comprises a reading system installed with one or more categories of teaching materials comprising language, science, math, geography, history, physics, chemistry, art, or music, and the reading system can work with cloud computing.

6. A pair of AR smart glasses, comprising:
    a frame unit comprising a lens, the lens comprising a semitransparent display portion
    wherein a shading sheet is disposed in front of the semitransparent display portion to form a shading portion, and the shading portion is made of a translucent material or an opaque material.

7. The pair of AR smart glasses of claim 6, further comprises a host or a smartphone, the host or the smartphone comprises a reading system installed with one or more categories of teaching materials comprising language, science, math, geography, history, physics, chemistry, art, or music, and the reading system can work with cloud computing.

8. An eye-protective shade for augmented reality (AR) smart glasses, comprising:
    an eye protection unit disposed in front of the AR smart glasses, and the eye protection unit is made of an electrochromic liquid crystal lens; and
    a shading portion disposed on a part of the eye protection unit;
    wherein the shading portion is made of a translucent or an opaque material, and the shading portion corresponds to a semitransparent display portion of the AR smart glasses.

9. A pair of AR glasses, comprising:
a frame unit comprising a lens, the lens comprising a semitransparent display portion; and
the eye-protective shade of claim 8, detachably or integrally disposed on the pair of AR smart glasses.

10. The pair of AR smart glasses of claim 9, further comprises a host or a smartphone, the host or the smartphone comprises a reading system installed with one or more categories of teaching materials comprising language, science, math, geography, history, physics, chemistry, art, or music, and the reading system can work with cloud computing.

11. An eye protective shade for augmented reality (AR) smart glasses, comprising:
an eye protection unit disposed in front of the AR smart glasses, and the eye protection unit is made of a plane lens; and
a shading portion disposed on a part of the eye protection unit;
wherein the shading portion is made of an opaque material, and the shading portion corresponds to a semitransparent display portion of the AR smart glasses.

12. A pair of AR smart glasses, comprising:
a frame unit comprising a lens, the lens comprising a semitransparent display portion; and
the eye-protective shade of claim 11, detachably or integrally disposed on the pair of AR smart glasses.

13. The pair of AR smart glasses of claim 12, further comprises a host or a smartphone, the host or the smartphone comprises a reading system installed with one or more categories of teaching materials comprising language, science, math, geography, history, physics, chemistry, art, or music, and the reading system can work with cloud computing.

14. An eye protective shade for augmented reality (AR) smart glasses, comprising:
an eye protection unit disposed in front of the AR smart glasses, and the eye protection unit is made of a convex lens;
a shading portion disposed on a part of the eye protection unit;
wherein the shading portion is made of a translucent material or an opaque material, and the shading portion corresponds to a semitransparent display portion of the AR smart glasses.

15. A pair of AR smart glasses, comprising:
a frame unit comprising a lens, the lens comprising a semitransparent display portion; and
the eye-protective shade of claim 14, detachably or integrally disposed on the pair of AR smart glasses.

16. The pair of AR smart glasses of claim 15, further comprises a host or a smartphone, the host or the smartphone comprises a reading system installed with one or more categories of teaching materials comprising language, science, math, geography, history, physics, chemistry, art, or music, and the reading system can work with cloud computing.

17. An eye protective shade for augmented reality (AR) smart glasses, comprising:
an eye protection unit disposed in front of the AR smart glasses, and the eye protection unit is made of a regular lens;
a shading portion disposed on a part of the eye protection unit;
wherein the shading portion is made of an opaque material, and the shading portion corresponds to a semitransparent display portion of the AR smart glasses.

18. A pair of AR smart glasses, comprising:
a frame unit comprising a lens, the lens comprising a semitransparent display portion; and
the eye protective shade of claim 17, detachably or integrally disposed on the pair of AR smart glasses.

19. The pair of AR smart glasses of claim 18, further comprises a host or a smartphone, the host or the smartphone comprises a reading system installed with one or more categories of teaching materials comprising language, science, math, geography, history, physics, chemistry, art, or music, and the reading system can work with cloud computing.

* * * * *